Sept. 9, 1941.  S. L. WILLIS  2,255,236
MULTICELLULAR GLASS
Filed Nov. 5, 1937  2 Sheets-Sheet 1
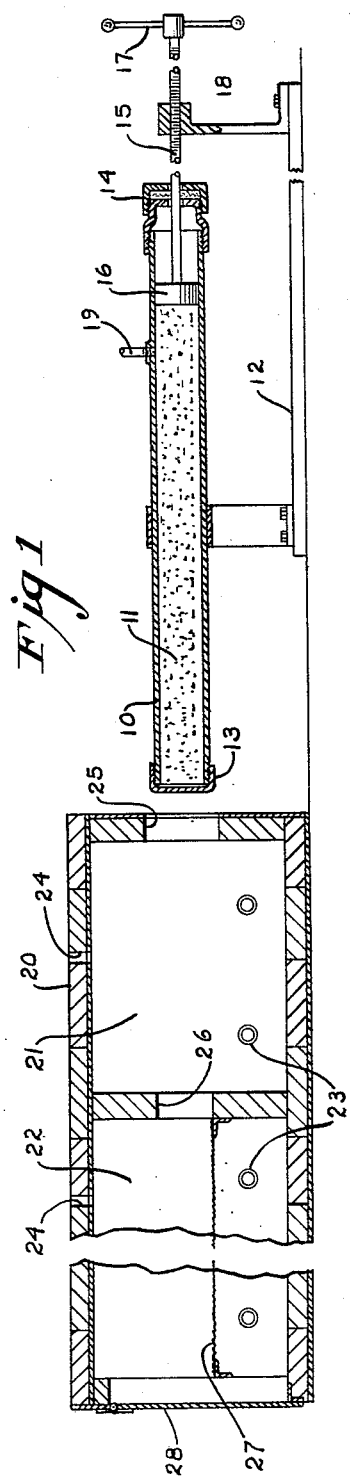
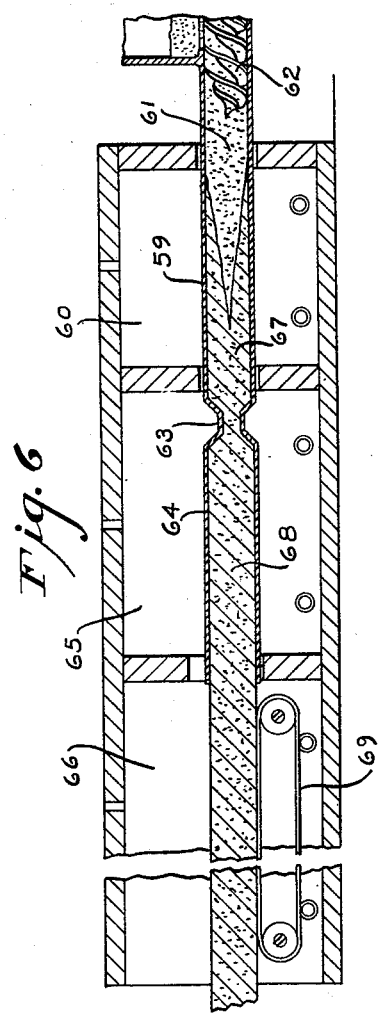
INVENTOR.
SANFORD L. WILLIS
BY Dorsey, Colet+Garner
ATTORNEYS.

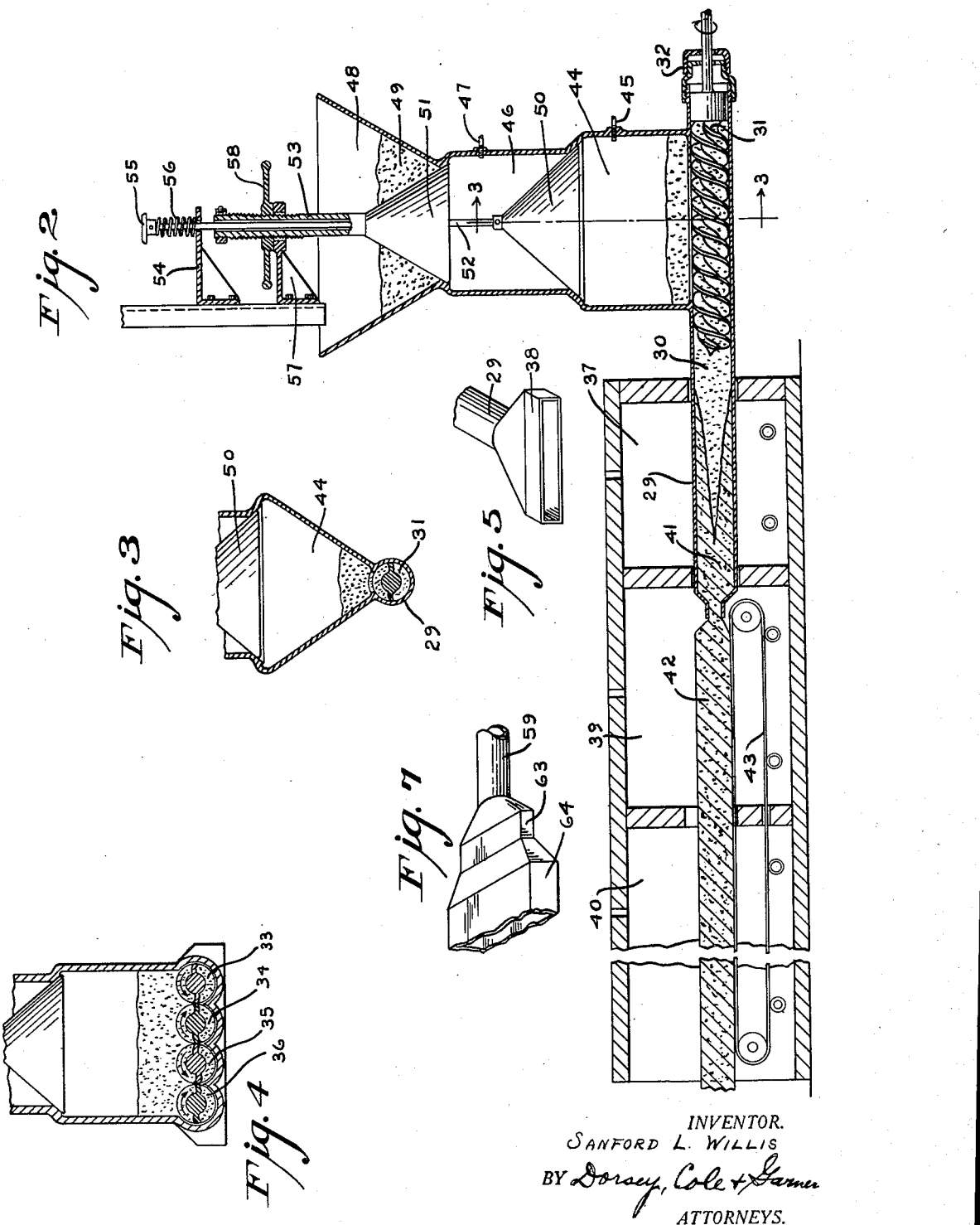

Patented Sept. 9, 1941

2,255,236

UNITED STATES PATENT OFFICE 2,255,236

MULTICELLULAR GLASS

Sanford L. Willis, White Plains, N. Y., assignor to Corning Glass Works, Corning, N. Y., a corporation of New York Application November 5, 1937, Serial No. 173,018

3 Claims. (Cl. 49—92)

This invention relates to the production of glass foam or multicellular glass and to the fabrication therefrom of articles such as bricks, blocks, sheets and the like for building construction, insulation, etc.

Prior methods of making such articles are for the most part discontinuous or intermittent processes and there has been a notable lack of uniformity in the product in that the cells or voids vary considerably as to size and number with consequent variation in specific gravity and mechanical strength. Gasifying materials which are added to the glass are lost in varying degree during melting of the glass or fabrication of the article, depending upon the time and temperature of heating, with consequent variation in cell structure.

It is the object of this invention to produce multicellular glass articles of uniform cell structure.

The above and other objects may be accomplished by practicing my invention, which embodies among its features heating granular or pulverized glass under mechanical and fluid pressure to sinter the glass particles and entrap compressed interstitial air or other gas, thereby producing a frit containing compressed gas bubbles and further heating the fritted mass under a lower pressure to cause expansion of the bubbles.

My invention further resides in various novel features of the processes herein described and in the novel construction combination and arrangement of apparatus useful in practicing the invention to be more fully described herein, claimed in the appended claims and illustrated in the accompanying drawings in which:

Fig. 1 is an elevation mostly in section of an apparatus for sintering granular or pulverized glass under mechanical and fluid pressure in accordance with my invention;

Fig. 2 is an elevation partly in section of an apparatus for continuously sintering granular or pulverized glass under mechanical and fluid pressure and thereafter expanding it in accordance with my invention;

Fig. 3 is a sectional view on the line 3—3 of Fig. 2 showing the feeding means;

Fig. 4 is a sectional view of a modification of the feeding means of Fig. 3 showing a multiple screw feed;

Fig. 5 is a detail perspective view of the orifice of the apparatus shown in Fig. 2;

Fig. 6 is a vertical sectional view of a modified portion of the apparatus shown in Fig. 2; and Fig. 7 is a detail perspective view of the orifice of the apparatus shown in Fig. 5.

In Fig. 1 a sintering tube 10, which in the present instance has a circular cross section but which may have any desired cross sectional form, contains granular or pulverized glass 11 to be fritted and is rigidly attached to a movable base 12. One end of the tube 10 is closed by a cap 13 while the opposite end is provided with a stuffing box 14 through which passes a rod 15. Within the tube 10 the inner end of the rod 15 is attached to a piston 16 and its outer end is provided with a hand wheel 17. The outer portion of the rod 15 is spirally threaded and passes through a feed block 18 which is also attached to the base 12. Rotation of the hand wheel 17 will thus advance the piston 16 within the tube 10. An inlet 19 is provided for admission of compressed air or other suitable gas.

Positioned in front of the tube 10 is a sintering furnace 20 which is divided into two chambers 21 and 22 and is provided with burners 23 and vents 24 for the escape of combustion products. The chamber 21 is provided with a side port 25 for insertion of the tube 10 while chamber 22 is provided with a port 26 for entrance of the extruded frit, a shelf 27 to receive the frit and a door 28 to permit its removal from the kiln.

In Fig. 2 a sintering tube 29 containing granular or pulverized glass 30 is provided with a feed screw 31 the shaft of which passes through a stuffing box 32 and is driven by a motor and reduction gears (not shown). Alternatively a plurality of feed screws 33, 34, 35 and 36 may be employed, as shown in Fig. 4 in which the screws 33 and 35 are threaded in one sense, for example, left handed, and the screws 34 and 36 are threaded in the opposite sense. The right and left handed screws are rotated in alternate directions. Obviously a piston may be employed in lieu of the feed screws of Fig. 3 and 4 in which event the piston may possess any desired cross sectional shape to conform with the general cross sectional shape of the sintering tube, that is circular or rectangular. The tube 29 extends into and through a sintering furnace 37 and its end is drawn down and spread to form a rectangular orifice 38 as shown in Fig. 5, the cross-sectional area of which is substantially equal to that of the sintering tube 29, but may be less as will appear. Adjoining the sintering furnace and communicating therewith is a kiln 39 which forms the hot end of an annealing lehr 40. A fritted mass of glass 41 within the tube 29 extends through and from the orifice 38 into the kiln 39 and expands to form a cellular frit 42 which is received on a conveyer 43 moving through the kiln 39 and the lehr 40.

The glass may be fed to the sintering tube in any suitable or desired manner. For the purpose of illustration an arrangement for introducing separate charges intermittently will be described. On top of the tube 29 and communicating therewith, as shown in Figs. 2 and 3, is a vertical hopper comprising a lower chamber 44 which is provided with a compressed air or gas inlet 45, a middle chamber or air lock 46 which is also provided with a compressed air or gas inlet 47 and an upper chamber 48 which is open at its top for receiving a supply of granular or pulverized glass 49. A cone 50 separates the chamber 44 from the air lock chamber 46 and another cone 51 separates the air lock 46 from the upper chamber 48. A shaft 52 which is attached to the cone 50 and is adapted to raise and lower it, passes upwardly through a hollow shaft 53 which is attached to the cone 51 for the purpose of raising and lowering the cone 51. At its upper end the shaft 52 passes through a support 54 and is provided with a pressure actuated handle 55 which operates against a spring 56. The upper end of the shaft 53, which is spirally threaded, passes through a support 57 and is provided with a hand wheel 58 which is interiorly threaded to coincide with the threaded shaft 53, and which is adapted on being revolved to raise and lower the shaft.

In Fig. 6 a sintering tube 59 extending through a sintering furnace 60 is supplied with pulverized glass 61 by means of a screw feed 62 and compressed air in the manner shown and described above for Fig. 2. The tube 59 is provided with an orifice 63 and an intercommunicating expansion chamber 64, connected therewith as shown in detail in Fig. 7. The expansion chamber 64 extends through a kiln 65 which forms the hot end of a lehr 66. A fritted mass of glass 67 extends through the orifice 63 and is expanded to form a cellular frit 68 which fills the expansion chamber 64 and upon emerging therefrom is received upon a conveyer 69.

In practicing my invention a quantity of pulverized glass 11 is introduced into the tube 10 which is closed with the cap 13, the piston 16 is advanced by turning the hand wheel 17 so as to bring the powdered glass under a slight mechanical pressure and compressed air is admitted through the inlet 19 to maintain a pressure of about 50–100 lbs. per square inch within the tube and throughout the mass of pulverized glass. The piston 16, being not entirely air-tight, will not interfere with the passage of air to the forward part of the tube. The assembly on its base 12 is then advanced until the tube 10 is inserted within the chamber 21 of the furnace 20 and the temperature of the tube is maintained at the sintering point of the pulverized glass until the latter has sintered sufficiently to seal the end of the tube 10. The tube is then withdrawn from the furnace and the cap 13 is removed after which the tube is reinserted so that its end registers with the port 26 of the chamber 22. The piston 16 is then advanced at a rate sufficient together with the air pressure in the tube to extrude the sintered mass from the forward end of the tube 10 but not too fast to prevent complete sintering of the granular or powdered glass as it passes through the heated portion of the tube. The air pressure is maintained during the entire operation and as a result a viscous sintered mass of glass containing countless cells or bubbles of compressed air will be extruded from the end of the tube 10 and will be deposited upon the shelf 27 in the chamber 22. The temperature of the chamber 22 is maintained somewhat higher than that of the chamber 21 to further reduce the viscosity of the glass and cause the air entrapped therein to expand and increase the size of the cells contained in the finished product. The expanded cellular frit is subsequently removed from the chamber 22 and may be annealed in the usual manner.

It will be apparent that the temperature at which the chambers 21 and 22 are to be maintained will depend upon the softening point of the glass employed and hence upon its composition. Practically any glass composition can be employed in my process, but it is preferable to use a glass having a relatively low softening point and a moderate temperature-viscosity range. In most instances it will be found desirable to employ temperatures of about 1100° F. in chamber 21 for sintering and from 1500° F. to 1800° F. in chamber 22 for expanding the frit, but with any particular glass the most suitable temperatures are readily determined by trial.

The modified form of apparatus which is illustrated in Fig. 2 is adapted for continuous production and may be employed either for making bricks, blocks and the like, or for the production of sheets and other large articles of multicellular glass. In this case the pulverized glass 30 is fed continuously into and through the extrusion or sintering tube 29 by means of the feed screw 31 and compressed air. A supply of pulverized glass is maintained in the chamber 44 and compressed air, admitted at the inlet 45, permeates and fills the interstices between the glass particles in the tube 29. For the purpose of replenishing the supply of pulverized glass in the chamber 44, the fresh quantity 49 is introduced into the air lock chamber 46 by lowering the cone 51 after which the cone is returned to its seat to seal the chamber 46 against the outside air. Compressed air is then admitted to the chamber 46 through the inlet 47, preferably at a pressure slightly in excess of that maintained in the chamber 44 and the cone 50 is then lowered by operation of the handle 55. This permits the charge of pulverized glass to enter the chamber 44 without loss of the air pressure therein. After the pulverized glass has been discharged from the chamber 46, the cone 50 is returned to its seat and the chamber 46 is sealed from the chamber 44. Before a fresh charge of pulverized glass is introduced into the chamber 46 from the chamber 48, the air pressure in the chamber 46 preferably is released through the inlet 47, thereby avoiding a blow-back when the cone 51 is again lowered.

As the pulverized glass 30 under the influence of the mechanical and fluid pressure is moved forward through that portion of the extrusion tube 29 which is within the furnace 37, it is heated sufficiently to cause the glass particles to sinter and coalesce and entrap the air in the interstices thereof, thereby forming the viscous fritted mass 41 containing countless bubbles of compressed air. The frit 41 is forced continuously through the orifice 38 into the kiln 39 and upon the conveyer 43. The temperature of the kiln 39, as pointed out above, is somewhat higher than the temperature of the sintering furnace 37 and under the influence of this increased temperature the viscosity of the frit 41 is reduced and the compressed air bubbles entrapped therein expand thereby forming the expanded frit 42 with a uniform cellular structure. The conveyer 43 continuously carries the expanded frit 42 into the annealing lehr 40 where it is slowly cooled in the usual manner after which it may be cut into blocks or sheets of convenient size by sawing or grinding or both.

The expansion of the fritted mass 41 by the method described above is unconfined and free to proceed to a maximum. It may be desirable to confine the mass during expansion or limit the thickness of the expanded frit in order to obtain a uniformly thick product with vitreous surfaces. This can be done by passing the expanded frit 42 between rolls (not shown) while it is still soft enough to be shaped but is preferably accomplished by means of the modified apparatus shown in Fig. 6. The fritted mass 67 is formed and extruded from the orifice 63 in the manner described above for Fig. 2. However, instead of being permitted to expand freely as before, it passes through the expansion chamber 64 which maintains it to the desired dimensions when it expands during its travel through the kiln 65. Expansion may take place transversely of the extruded frit or it may be caused to occur longitudinally thereof by speeding up the rate of flow in the expansion chamber. In the latter event the expansion chamber may have substantially the same cross section as the orifice. Upon issuing from the expansion chamber into the lehr 66 and upon conveyer 69, the expanded frit 68 will have acquired the dimensions of the expansion chamber.

The sintering tube of the embodiment illustrated is shown as horizontal. Certain advantages are obtained if the tube is positioned vertically providing certain features of a column. The weight of the glass will then have an effect, positive or negative, on the resistance to extrusion modifying the degree of choke necessary. If in such column the mass is fed downward the weight of the superimposed unconsolidated material above the sintering zone may provide the desired mechanical pressure at the sintering zone.

Other advantages may be obtained by feeding the charge upward in the vertical column. The weight of the column of material above the sintering zone will not necessarily add to the mechanical pressure compacting the glass at the sintering zone. The arrangements may be such that the air pressure predominates almost exclusively as the feeding force to feed and extrude the molten glass while the mechanical pressure merely holds the glass particles in place with as little pressure as desired. For some products it may be desirable even to release the mechanical pressure to permit the formation of large voids or weakened portions in the ribbon of glass.

It is a feature of the process herein described that provision is made for causing substantially equal amounts of air or other gas to be entrapped within the different zones of the sintering mass. If a quantity of pulverized glass resting on an impervious, non-porous support is heated in a muffle while maintaining normal atmospheric pressure within the muffle, the mass will fuse on the surface and will be cemented to the support at the edge and, as the heat penetrates inward, the expanded air will migrate inward while the successive zones fuse entrapping a proportion of the air. However, the migration of the air will bring about a condition wherein at the center there is a very considerably greater amount of air in proportion to the ground glass. The result of this is that a blow hole forms toward the center and makes it impossible to obtain a uniform cell structure. The position of the blow hole in the mass, its shape, etc., differs with various conditions. In some cases the final expanded finished mass is flat on the bottom with one or several blow holes within the mass. Under other conditions the glass mass is of substantially uniform cellular structure but with an air chamber formed between the glass and the support such that the bottom of the mass is hollowed and not flat. In other cases both conditions may prevail to various extents. However, if the mass of powdered or granular glass rests on a porous or perforated support when heated, the migrating air will escape through the porous support with the result that while the total expansion of the mass is not as great, the cell structure of the mass is substantially uniform and shows no blow holes or deformation of the bottom of the cake.

From the above it is evident that it is desirable to provide for bleeding out the excess portion of the gas during the progressive heating in order to obtain an equalization of pressure.

In the continuous process described to illustrate the principles of the present invention, the bleeding of the excess gas or air and the maintenance of equal gas pressures at the zone of sintering is maintained by heating the glass mass from the sides while leaving open communication to the rear through the moving mass.

The successful practice of my invention is subject to the following considerations:

*Grain size.*—Voids within granular aggregates depend upon close sizing of the grains rather than upon their average size. In fact, with all grain sizes down to a fine dust, the percentage of voids will remain practically constant, if the material is closely sized. The percentage of voids can be decreased materially through inclusion within the mass of a percentage of grains finer than the main body of the mass, or through the use of a wide range of sizes, the decrease being due to the tendency of the fines to fill the interstices between the larger grains. Other factors remaining constant, the use of finer grained material will result in the formation of more and smaller cells although the aggregate cell volume will remain fairly constant. The use of a wide range of sizes on the other hand will cut down the aggregate cell volume.

*Mechanical pressure.*—The function of the mechanical pressure, such as that exerted by the feeding devices described above, is to hold the glass particles in contact so as to facilitate heat penetration, inhibit air migration and premature expansion as the heat penetrates the mass, and to facilitate sintering and sealing of the cells. For a maximum amount of occluded air, the mechanical pressure should be no higher than is necessary to accomplish the desired result. Pressures which are higher than necessary result in a material reduction in cell volume of the frit, but this may be counterbalanced by the use of higher air pressures as will later appear. It should be noted that the progress of the sintered material through the sintering tube is due chiefly to the pressure exerted by the air. The mechanical pressure simply follows up the progress of the material, holding the grains in place during sintering and will constitute only a very small part of the total driving force.

*Fluid pressure.*—It is obvious that any gas that has no objectionable effect or reaction upon the glass and the apparatus may be employed as a means for exerting fluid pressure in the above described method, but on account of its easy availability I prefer to use air. The final specific gravity of the mass will depend upon the ultimate expansion of the air cells and will be inversely proportional to the air pressure used during the sintering operation. Since the air pressures are practically static, and high static pressures can be readily obtained and held, it follows that air pressure variation can be used to counterbalance low percentages of voids in the frit. Thus, if it is desired to use a wide range of grain sizes and high mechanical pressures, a product of low specific gravity may be obtained by increasing the air pressure. In a sintering tube in which the ratio of circumference to cross sectional area is high, the natural tendency of the viscous molten mass to wet and stick to practically all types of surfaces will suffice to prevent excessive speed of flow, and such retardance will permit complete sintering of the mass as it passes through the sintering furnace. On the other hand, when the ratio between circumference and cross sectional area is low, it may be desirable further to retard the speed of flow by means of a slight constriction in the sintering tube placed preferably near the orifice, or by making the cross-sectional area of the orifice somewhat less than that of the sintering tube. In general, fluid pressures of 50–100 lbs. per square inch are suitable.

*Sintering temperature.*—As pointed out above, the sintering temperature will depend upon the glass composition used, but if the temperature employed is much higher than that necessary for sintering the powdered material, it may materially reduce the amount of air occluded, due to the collapse of the particles during sintering and before the cells are sealed.

*Expansion temperature.*—There is a definite limit to the cell expansion possible with a given initial cell gas pressure and this limit is attained with maximum temperatures but below this the temperature of expansion can be used to control the expansion and the gas pressure within the cells of the final product. Thus if a high air feed pressure is used and the expansion temperature is maintained at a point at which the frit is still quite viscous, a final product will be obtained in which the cell gas pressure will be considerably above atmospheric, but the specific gravity would be as low as would be obtained by the use of lower air pressures and higher expansion temperatures. Cell gas pressures above atmospheric possess the advantage that they promote increased mechanical strength.

*Expansion and annealing time.*—When the expansion of the fritted mass is carried on within the confines of an expansion chamber comprising an extension of the sintering tube, as shown in Fig. 6, the product will be extruded as fast as it expands so that the timing factor in this case is self-regulating. When on the other hand the frit is extruded into a kiln for free and unconfined expansion, the time interval required for expansion will materially affect the character of the product. Best results are obtained when the frit is heated quickly, and removed from the hot zone immediately the expansion has taken place. Long soaking at the higher temperature level causes the cells to coalesce, thus forming a large cell product. In annealing the product should be quickly chilled to a point at which viscosity is very high and then slowly cooled through the critical range in the usual manner.

While in the foregoing there has been shown and described the preferred embodiment of my invention, it is to be understood that minor changes in the process as described and in the details of construction, combination and arrangement of parts may be resorted to without departing from the spirit and scope of the invention as claimed.

I claim:

1. Glass which contains a multiplicity of small bubbles of gas under positive pressure at room temperature.

2. A foamed silicate block having a multiplicity of bubbles containing a gas under positive pressure at room temperature.

3. A shaped glass article having a multiplicity of bubbles containing a gas under positive pressure at room temperature.

SANFORD L. WILLIS.